Figure 1:
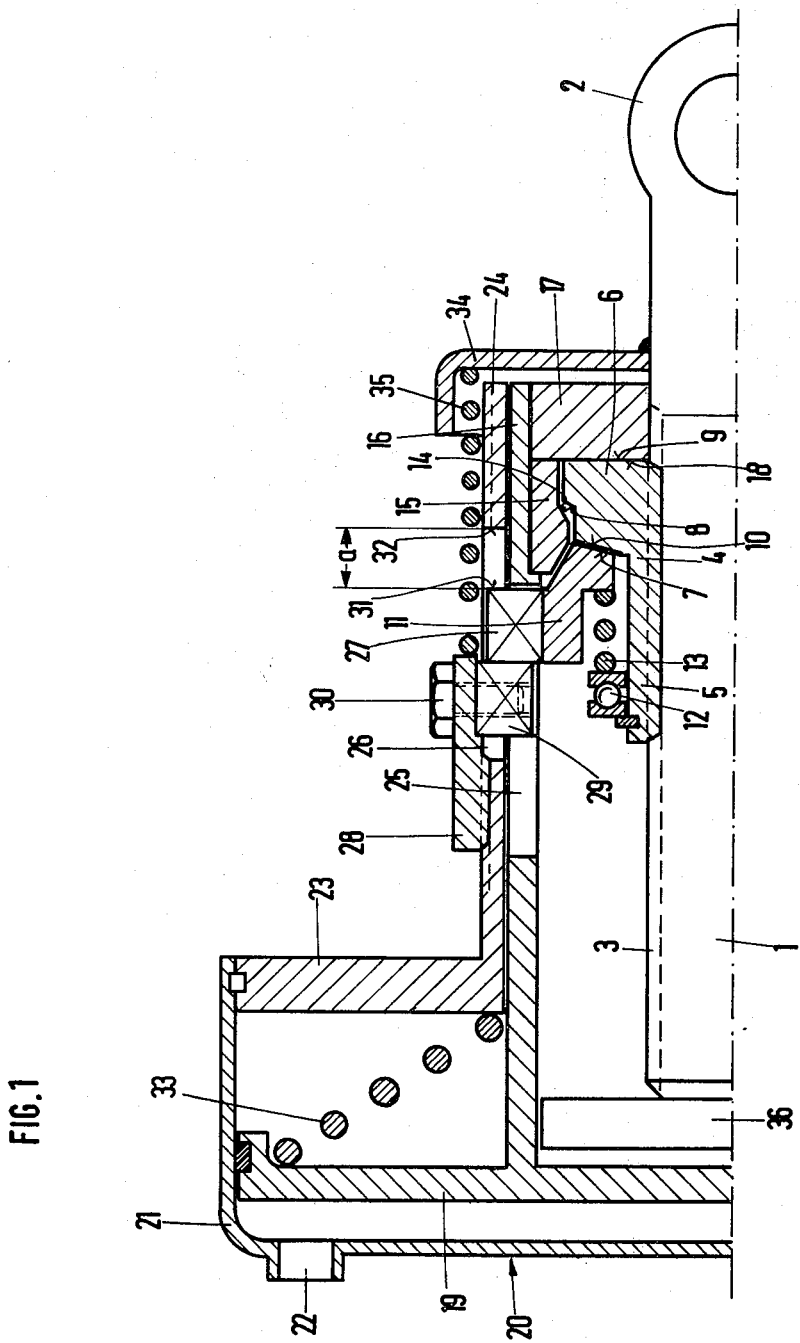

United States Patent
Nadas

[11] 3,899,053
[45] Aug. 12, 1975

[54] AUTOMATIC BRAKE-WEAR RESETTING DEVICE

[75] Inventor: Gyula Nadas, Eching, Germany

[73] Assignee: Knorr-Bremse GmbH, Munich, Germany

[22] Filed: Apr. 4, 1974

[21] Appl. No.: 457,966

[30] Foreign Application Priority Data
Apr. 4, 1973 Germany............................ 2316822

[52] U.S. Cl.............................. 188/203; 188/196 D
[51] Int. Cl.² ......................................... F16D 65/66
[58] Field of Search ......... 188/196 BA, 196 D, 198, 188/199, 202, 203

[56] References Cited
UNITED STATES PATENTS
| | | | |
|---|---|---|---|
| 3,430,739 | 3/1969 | Persson et al...................... | 188/202 |
| 3,550,732 | 12/1970 | Beller.............................. | 188/196 D |
| 3,744,596 | 7/1973 | Sander............................... | 188/203 |

Primary Examiner—Duane A. Reger
Attorney, Agent, or Firm—Edmund M. Jaskiewicz

[57] ABSTRACT

A brake cylinder has a reciprocating piston therein from which extends a sleeve surrounding a coaxial threaded shaft. A nut threaded on the shaft engages a surface on a control sleeve which is spring urged against the nut in the braking direction. Stop means are provided to limit the axial displacement of the control sleeve. The contracting surfaces of the nut and control sleeve define a first rotary coupling and a second rotary coupling is defined by a second surface on the nut with a first surface on the sleeve. Additional coacting surfaces on the nut and sleeve limit the distance to which the second rotary coupling opens. A spring acts upon the sleeve in a direction opposite to the direction of braking.

8 Claims, 2 Drawing Figures

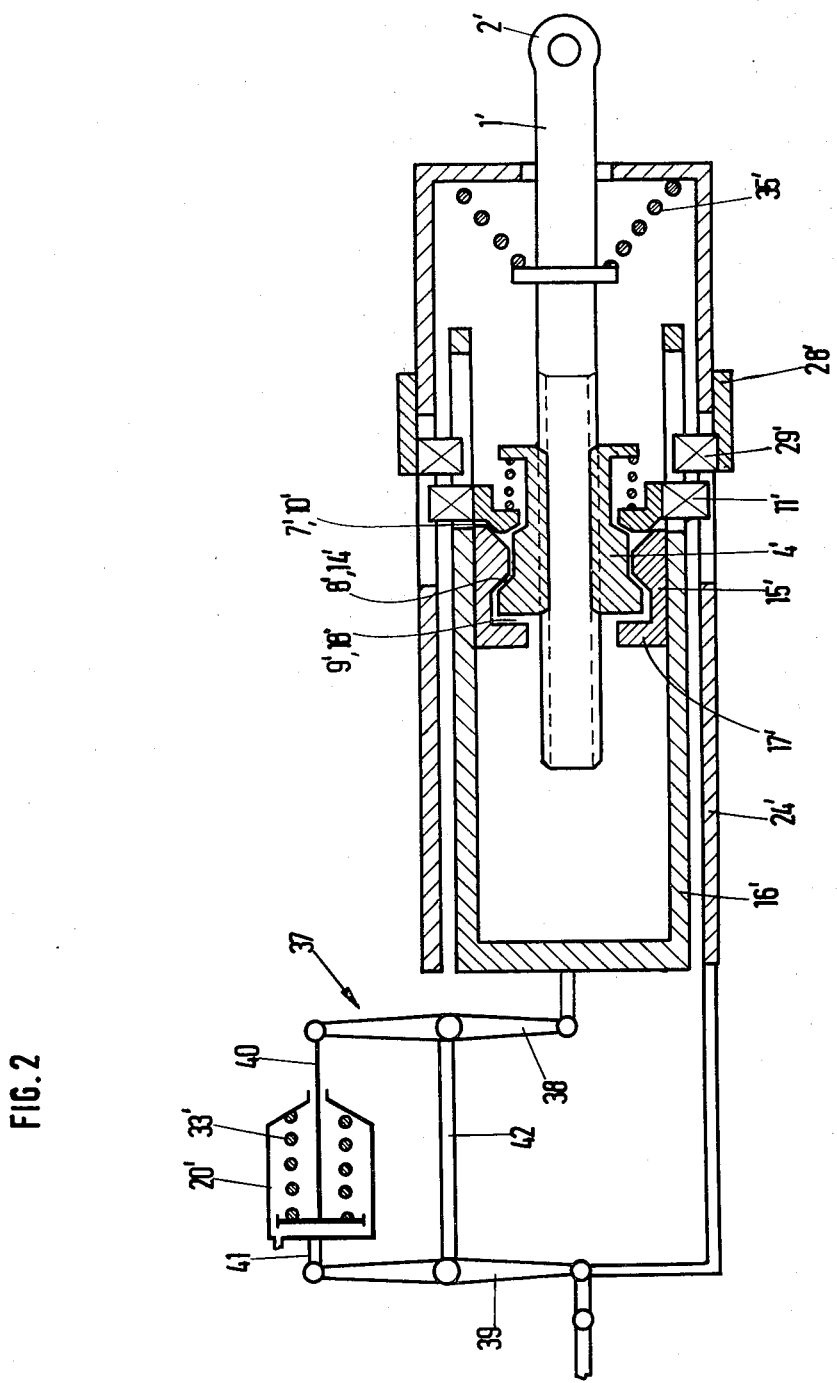

AUTOMATIC BRAKE-WEAR RESETTING DEVICE

The present invention relates to a brake on railway vehicles and the like, more particularly, to an automatic wear compensating device for such a brake.

Such brakes, particularly on railway vehicles, have been provided with automatic resetting or wear compensating devices. In one such form of a resetting device there is an axially displaceable non-rotatable spindle for transmitting braking force which is positioned coaxially within a sleeve which is subjected to a braking force. A coupling nut is threaded on the adjusting shaft and a control sleeve which is both rotatable and capable of axial displacement is urged by a spring in the braking direction against the coupling nut. The control sleeve is provided with a radial extension projecting through a longitudinal slot in the sleeve so that the control sleeve is non-rotatable and is capable of limited axial movement. A first rotary coupling is engaged by the force of the spring and is disposed between the coupling nut and the control sleeve. There is a second rotary coupling between the sleeve and the coupling nut and the second coupling can be switched by means of the relative displacement between the sleeve and the coupling nut.

Such a resetting device is disclosed in German Pat. No. 1,169,985. A disadvantage of such a resetting device is that a further nut must be provided together with associated control elements for releasing or blocking its rotation in addition to the coupling nut. The necessity of providing such an additional nut and its incidental and related structure significantly increases the complexity and the costs of manufacturing known resetting devices.

It is therefore the principal object of the invention to provide a novel and improved wear compensating device for vehicle brakes and particularly for railway vehicles.

It is another object of the present invention to provide such a wear compensating device which is simple in construction, employs a relatively small number of parts and can be manufactured at relatively low cost.

It is a further object of the present invention to provide such a wear compensating device which insures that the distance of the release stroke of the brake is always maintained constant.

According to one aspect of the present invention an automatic wear compensating or resetting device for brakes particularly for railway vehicles may comprise a non-rotatable sleeve axially displaceable in the braking direction in response to a braking force and a non-rotatable threaded shaft coaxially disposed within the sleeve and axially displaceable in the braking direction. A coupling nut is threaded upon the shaft so as to be capable of rotary and axial movement thereon. A non-rotatable control sleeve is resiliently urged in the braking direction against the coupling nut and is capable of limited axial displacement. The contacting surface of the nut and control sleeve define a first rotary coupling. A second surface on the nut is engageable with a surface on the sleeve upon relative axial displacement between the sleeve and nut and these surfaces define a second rotary coupling. A third surface on the nut contacts a second surface on the sleeve to define a stop limiting the opening between the elements of the second rotary coupling. A spring acts upon the sleeve in a direction opposite to the direction of braking to return the sleeve to its release position upon removal of the braking force.

The device can also be employed with a so-called H-brake linkage means which comprises first and second brake levers. A tubular portion surrounds the sleeve and has means for guiding and limiting the displacement of the control sleeve. The first lever of the linkage is further from the device and has one end thereof connected to the sleeve and the corresponding one end of the second lever is connected to the tubular portion.

The wear compensating device of the present invention will always maintain the distance of the release stroke at a constant. The distance through which the brake travels to the release position is of critical significance for the clearance or play in the brake which must be maintained constant and set as small as possible. The brake stroke or distance the brake moves into the braking position is not so significant since the brake stroke also includes the distance the brake must move to overcome any slack or play in the brake linkage.

Other objects and advantages of the present invention will be apparent upon reference to the accompanying description when taken in conjunction with the following drawings, which are exemplary, wherein:

FIG. 1 is a half of a longitudinal sectional view of a wear compensating device in a brake cylinder according to the present invention; and FIG. 2 is a longitudinal sectional view of such a device when used with an H-brake linkage.

Proceeding next to the drawings wherein like reference symbols indicate the same parts throughout the various views, a specific embodiment and modification of the present invention will be described in detail.

As may be seen in FIG. 1, the wear compensating or resetting device comprises an adjusting spindle shaft 1 having an eye 2 at its end by means of which the shaft is pivotably connected to a brake linkage which is not shown in the drawing.

The shaft is connected so as to be non-rotatable about its longitudinal axis and is provided with external threads 3 upon which a nut 4 is threaded. The nut 4 comprises a tubular portion 5 which engages the threads 3 of the shaft and a annular flange portion 6 on the side of the nut directed toward the eye 2.

On the side of the flange section 6 directed toward the tubular portion 5 there are two conical coupling annular surfaces 7 and 8 which are displaced radially with respect to each other and on the other side of the flange section 6 there is provided a radially extending abutment surface 9.

The annular coupling surface 7 engages a correspondingly shaped coupling surface 10 on a control sleeve 11 which is rotatably and axially moveable with respect to the nut 4. A compression spring 13 surrounds the tubular section 5 and has one end resting against a ballbearing 12 carried on the tubular section 5 and its other end acting upon a portion of the control sleeve 11 so as to urge the control sleeve in the braking direction and to position the surfaces 7 and 10 into coupling engagement to form a first rotary coupling. In order to achieve a positive coupling effect surfaces 7, 10 of the first rotary coupling may be provided with gear teeth in the form of bevel gears.

The radially outwardly disposed annular coupling surface 8 on the flange 6 coacts with a coupling surface 14 carried on an annular element 15 which is originally connected to a sleeve 16 surrounding the annular element 15 and extending outwardly of the nut 4. On the other side of nut 4 the sleeve 16 carries an inwardly projecting flange 17 having a radial abutment surface 18 thereon which coacts and is engageable with abutment surface 9. Abutment surfaces 9 and 18 limit the distance to which the elements 8 and 14 of the second rotary coupling can open.

The other end of sleeve 16 away from eye 2 projects beyond the end of adjusting spindle 1 and is connected to a piston 19 of a brake cylinder 20 contained in a housing 21. The housing 21 is provided with a connection 22 for the introduction of compressed air against the face of piston 19 away from sleeve 16. The cylinder housing 21 is closed by a radially extending wall 23 from which extends a tubular portion 24 surrounding sleeve 16. The sleeve 16 and tubular portion 24 are each provided with partially overlapping longitudinal slots 25 and 26, respectively, which receive a radial extension 27 on the control sleeve 11.

In the vicinity of wall 23 an adjusting ring 28 is threaded on the tubular portion 24 and is secured against undesired rotary movement by means of a nut 30 which is threaded into a sliding element 29 which is also received in longitudinal slots 25 and 26. The control lever extension 27 contacts the slide element 29 and is provided with a surface 31 directed toward eye 2 which is opposite an end surface 32 of longitudinal slot 26 at a distance $a$ which corresponds to the adjusted release stroke of the brake.

A relatively strong return spring 33 is positioned between piston 19 and wall 23 of the cylinder housing 21. A compression spring 35 which is relatively weak in strength with respect to return spring 33 is positioned between adjusting ring 28 and a flange 34 secured to the shaft 1. The spring 35 surrounds the tubular portion 24. A plate 36 is attached to the inner end of spindle shaft 1 so as to guide the shaft centrally within the sleeve 16.

When the brake is in the release position all of the components are in their positions as shown in FIG. 1. The return spring 33 maintains piston 19 in its end position away from the eye 2, abutment surfaces 9 and 18 are in contact with each other, the first rotary coupling 7, 10 is closed in engagement under the action of spring 13 and the second rotary coupling 8, 14 is open. The control sleeve 11 is positioned by means of its radial extension 27 abuting against sliding element 29 and the distance $a$ is thus established between face 31 of radial extension 27 and end 32 of slot 26. The nut 4 is held against rotation by means of control sleeve 11 which in turn is secured against rotation because of the engagement of its radial extension 27 in the longitudinal slots 25 and 26. The non-rotative state of control sleeve 11 is transmitted through first rotary coupling 7, 10 which is closed so as to prevent movement of adjusting shaft 1.

During the braking operation, compressed air is supplied to brake cylinder 20 through connection 22 and causes piston 19 and together therewith sleeve 16 to be moved against the force of spring 33. Because of the presence of play in the brake linkage which is connected to eye 2, the adjusting shaft will initially remain stationary so that abutment surfaces 9 and 18 will become separated and coupling surfaces 8 and 14 defining the second rotary coupling become engaged or enclosed.

Upon further displacement of piston 19 and sleeve 16 in the braking direction, annular element 15 and second rotary coupling 8, 14 which retains nut 4 against rotation will carry along nut 4 which will also displace adjusting shaft 1 because of the threaded connection between nut 4 and shaft threads 3. The spring 13 causes control sleeve 11 to follow the movement of nut 4 so that the first rotary coupling 7, 10 will remain closed until radial extension 27 abuts against slot end 32. This abutment will occur after the nut 4, adjusting shaft 1, and control sleeve 11 have been displaced the stroke distance $a$.

When the release clearance of the brake is properly adjusted, the clearance will be precisely at the end of the stroke and the brake will be applied but without force. In the event this release clearance becomes increased because of wear, the applying or contacting of the brake will be possible wholly upon an additional movement as will be presently described and in any event in the same manner as the tightening of the brake.

Upon further displacement of piston 19 in the braking direction under the action of compressed air, control sleeve 11 will be stopped from further movement because of the abutment of surface 31 with slot end 32 and thus the displacement of sleeve 16 will occur independently of control sleeve 11. The nut 4 will be further displaced under the action of sleeve 16 through annular element 15 and the second rotary coupling 8, 14 is still engaged without the possiblity of rotation. However, annular coupling surfaces 7 and 10 will be separated so that the first rotary coupling 7, 10 will be opened or disengaged against the force of spring 13. The displacement of nut 4 will also move adjusting spindle shaft 1 in the braking direction to tighten the applied brake by means of the brake linkage connected to the shaft eye 2.

To release the brake upon termination of the braking operation, the air pressure supplied to brake cylinder 20 is reduced to an extent that the tension prevailing in the brake linkage and the brake pushes back shaft 1 together with nut 4 and, through second rotary coupling 8, 14, sleeve 16 and piston 19. This movement continues until the tensions in the linkage are reduced completely and the brake is merely in contact with the braking surface without any force. In the event that the release stroke of the brake corresponds to the required value, the first rotary coupling 7, 10 between nut 4 and control sleeve 11 will be closed precisely upon the completion of the removal of tension in the brake linkage.

Should the release stroke of the brake be too large because of wear, the adjusting shaft 1 together with nut 2 will be returned only to such a position in which the coupling surface 10 is spaced from its corresponding coupling surface 11 at a distance which corresponds to the excess of the release play as measured in the axial direction. While the first rotary coupling 7, 10 remains in this open position piston 19 and sleeve 16 will be pushed further back by return spring 13 toward their initial or release position as shown in FIG. 1. Since the brake linkage is now not subjected to any tension and adjusting shaft 1 is additionally loaded by spring 35 with a relatively weak force against such a direction of displacement, neither the brake linkage nor shaft 1 will follow such a displacement. The nut 4 will also be held back such that during slight shifting of sleeve 16 the second rotary coupling 8, 14 will be opened. Subsequently, the nut 4 will follow the displacement of sleeve 16 by rotating upon the threads 3 on shaft 1 under the force applied by spring 13. This action will continue until coupling surfaces 7 and 10 are engaged to close rotary coupling 7, 10 and thus retain nut 4 against rotation. At such a point, the nut 4 was threaded in the release direction on shaft 1 through a distance corresponding to the excess of the release clearance and is thus set in a position upon completion of the removal of tension from the brake linkage. Therefore, the release stroke will correspond to the desired value of this relationship.

A subsequent release procedure as described above is the same whether or not an excess stroke for the release clearance was present at the beginning of the release operation. During further displacement of piston 19 and sleeve 16 in the return direction the nut 4 which is secured against rotation together with shaft 1 remains somewhat to the rear, at least initially, until surfaces 9 and 18 abut. Subsequently, return spring 33 will move nut 4 back, which is still held against rotation by first rotary coupling 7, 10, by means of piston 19, sleeve 16, flange 17 and abuting surfaces 9, 18. The nut 4 will thus take along shaft 1 and the brake linkage because of its threaded connection. Also, the control sleeve 11 will be carried along because of the closed rotary coupling 7, 10 and this will bring about a separation of end surface 31 from slot end 32. The compression spring 35 which is relatively weak in strength with respect to return spring 33 cannot prevent this movement. The movement will continue until radial extension 27 abuts sliding element 29 after traversing stroke distance $a$. After removal of tension, the brake linkage was still subjected to a release stroke corresponding to the stroke distance $a$ so that the brake is now released with the required clearance. The initial state is thus attained in this manner.

While the present embodiment has been disclosed as employing compressed air to establish a braking force within brake cylinder 20 other pressure media may be used for this purpose. Also, under certain circumstances it may be desirable to provide sleeve 16 and tubular portion 20 with a plurality of longitudinal slots 25, 26 uniformly positioned around their peripheries and to provide control sleeve 11 with a corresponding plurality of radial extensions 27 to be within these slots. The longitudinal slot 26 may also be modified to comprise a longitudinal groove which does not pass through the wall of tubular section 24. Accordingly, corresponding modifications would then be made in the abutment surface 31 of extension 27 and end surface 32 of slot 26.

It is also possible to position a bellows extending from flange 34 to the end of tubular portion 24 which is adjacent wall 23 so as to enclose completely compression spring 35 and also adjusting ring 28 to protect the wear compensating device against dirt and other foreign matter.

The wear compensating device of the present invention may also be employed in connection with an H-brake linkage as illustrated in FIG. 2. In such an application, the wear compensating device is subjected to pull stresses by the braking forces in contrast with the structure of FIG. 1 wherein it is pressure stress. Accordingly, the device of FIG. 2 is basically identical to the structure of FIG. 1 as indicated by the like reference numerals which are provided with primes. However, these same elements are positioned in a 180° relationship with respect to their positions in FIG. 1.

The H-linkage which is indicated generally at 37 comprises two brake levers 38 and 39 with one end of lever 38 being connected to a piston rod 40 extending outwardly of brake cylinder 20' and one end of lever 39 connected to a fixed point 41. The other end of lever 38 is connected to sleeve 16' and the other end of lever 39 is connected to tubular portion 24'. In a like manner the brakes to be actuated are pivotably connected to eye 2' of adjusting spindle 1' and to the end of brake lever 39 which is also connected to tubular 24'. A return spring 33' within brake cylinder 20' is also employed as a return spring for the linkage to move the linkage from its untensioned position to its release position during the release operation. Accordingly, the spring 33' is strong. A pull rod 42 is pivotally connected between brake levers 38 and 39 and may be of a relatively simple construction as illustrated. However, the rod 42 may also be constructed with variable connection points to the brake levers in order to provide braking operations which are responsive to the loads on the vehicles.

Thus it can be seen that the present invention has provided a brake resetting or wear compensating device for brakes which is simple in structure and provides for automatic adjustment of the release stroke so as to maintain the release stroke constant.

It will be understood that this invention is susceptible to modification in order to adapt it to different usages and conditions, and accordingly, it is desired to comprehend such modifications within this invention as may fall within the scope of the appended claims.

What is claimed is:

1. In an automatic resetting device for brakes particularly for railway vehicles, the combination of a nonrotatable first sleeve axially displaceable in the braking direction in response to a braking force, a nonrotatable threaded shaft coaxially disposed within said first sleeve and axially displaceable in the braking direction, a coupling nut threaded upon said shaft and capable of rotary and axial movement thereon, a nonrotatable control sleeve resiliently urged in the braking direction against said coupling nut and capable of limited axial displacement, the contacting surfaces of said nut and control sleeve defining a first rotary coupling, said nut having a second surface engageable with a first surface on said first sleeve upon relative axial displacement between said first sleeve and said nut to define a second rotary coupling, said nut having a third surface contacting a second surface on said first sleeve to define a stop limiting the opening of said second rotary coupling, and spring means acting upon said first sleeve in a direction opposite the direction of braking to return the first sleeve to its release position upon removal of the braking force.

2. In an automatic resetting device as claimed in claim 1 wherein said first and second rotary couplings are radially displaced from each other on the side of said nut away from said third surface thereof.

3. In an automatic resetting device as claimed in claim 1 wherein said first rotary coupling comprises opposed toothed surfaces.

4. In an automatic resetting device as claimed in claim 1 and second spring means acting upon said shaft in the direction of the braking force.

5. In an automatic resetting device as claimed in claim 1 and a brake cylinder having a slideable piston therein and said piston connected to said first sleeve, said spring means acting upon the first sleeve side of said piston and on a portion of said cylinder.

6. In an automatic resetting device as claimed in claim 5 and a tubular portion extending from said cylinder and surrounding said first sleeve, there being a longitudinal slot in said first sleeve surrounding portion, a radial projection on said control sleeve extending into said slot, and adjustable abutment means within said slot at the end thereof closer to said piston such that said abutment means and the other end of said slot limit the range of axial displacement of said control sleeve.

7. In an automatic resetting device as claimed in claim 1 and a tubular portion surrounding said first sleeve and having means for guiding and limiting the displacement of said control sleeve, H-brake linkage means comprising first and second brake levers, said first lever being further from the resetting device and having one end thereof connected to said first sleeve and one end of said second lever is connected to said tubular portion.

8. In an automatic resetting device as claimed in claim 7 and third spring means urging said shaft in the braking direction and disposed between said shaft and said tubular portion.

* * * * *